United States Patent
Qu et al.

(10) Patent No.: US 9,104,870 B1
(45) Date of Patent: Aug. 11, 2015

(54) DETECTING MALWARE

(71) Applicant: Palo Alto Networks, Inc., Santa Clara, AZ (US)

(72) Inventors: Bo Qu, Santa Clara, CA (US); Xinran Wang, San Ramon, CA (US); Kyle Sanders, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 13/631,654

(22) Filed: Sep. 28, 2012

(51) Int. Cl.
*G06F 11/00* (2006.01)
*G06F 17/30* (2006.01)
*G06F 21/56* (2013.01)

(52) U.S. Cl.
CPC .................... *G06F 21/563* (2013.01)

(58) Field of Classification Search
CPC . G06F 21/563; H04L 63/1441; H04L 63/145; H04L 63/14
USPC ..................... 726/22–25, 1, 26, 27
See application file for complete search history.

(56) References Cited

U.S. PATENT DOCUMENTS

| | | | |
|---|---|---|---|
| 5,983,348 A | 11/1999 | Ji | |
| 7,409,718 B1 * | 8/2008 | Hong et al. | 726/24 |
| 7,496,963 B2 * | 2/2009 | Shipp | 726/24 |
| 7,568,233 B1 * | 7/2009 | Szor et al. | 726/25 |
| 7,649,838 B2 | 1/2010 | Fishteyn et al. | |
| 7,664,855 B1 | 2/2010 | Freed et al. | |
| 7,779,472 B1 * | 8/2010 | Lou | 726/24 |
| 7,870,610 B1 | 1/2011 | Mitchell et al. | |
| 7,958,555 B1 | 6/2011 | Chen et al. | |
| 8,011,010 B2 * | 8/2011 | Michael et al. | 726/24 |
| 8,141,132 B2 | 3/2012 | Oliver et al. | |
| 8,201,246 B1 * | 6/2012 | Wu et al. | 726/22 |
| 8,209,680 B1 * | 6/2012 | Le et al. | 717/174 |
| 8,225,317 B1 * | 7/2012 | Chiueh et al. | 718/1 |
| 8,260,914 B1 | 9/2012 | Ranjan | |
| 8,291,468 B1 | 10/2012 | Chickering | |
| 8,316,440 B1 | 11/2012 | Hsieh et al. | |
| 8,321,936 B1 * | 11/2012 | Green et al. | 726/23 |
| 8,359,651 B1 | 1/2013 | Wu et al. | |
| 8,370,938 B1 | 2/2013 | Daswani et al. | |
| 8,402,543 B1 | 3/2013 | Ranjan et al. | |
| 8,407,324 B2 | 3/2013 | McDougal | |

(Continued)

FOREIGN PATENT DOCUMENTS

| | | |
|---|---|---|
| WO | 2012134584 | 10/2012 |
| WO | 2013067505 | 5/2013 |

(Continued)

OTHER PUBLICATIONS

Sun et al, Malware Virtualization-resitant behavior detection, 2011 IEEE, pp. 912-917.*

(Continued)

*Primary Examiner* — Abu Sholeman
(74) *Attorney, Agent, or Firm* — Van Pelt, Yi & James LLP

(57) ABSTRACT

An example of candidate malware is data that potentially includes one or more malicious elements. Candidate malware is received. The received candidate malware is analyzed using a virtual machine. A determination is made that the candidate malware has attempted to perform an anti-virtual machine action. Output that indicates that the candidate malware is malicious is generated.

20 Claims, 4 Drawing Sheets

(56) References Cited

U.S. PATENT DOCUMENTS

| | | | |
|---|---|---|---|
| 8,438,639 B2 | 5/2013 | Lee et al. | |
| 8,443,363 B1* | 5/2013 | Brennan et al. | 718/1 |
| 8,443,449 B1 | 5/2013 | Fan et al. | |
| 8,464,341 B2* | 6/2013 | Cohen | 726/22 |
| 8,479,295 B2 | 7/2013 | Sahita et al. | |
| 8,484,732 B1* | 7/2013 | Chen et al. | 726/23 |
| 8,484,739 B1 | 7/2013 | Seshadri | |
| 8,510,827 B1 | 8/2013 | Leake et al. | |
| 8,516,591 B2 | 8/2013 | Fly et al. | |
| 8,521,667 B2 | 8/2013 | Zhu et al. | |
| 8,539,577 B1 | 9/2013 | Stewart et al. | |
| 8,572,740 B2 | 10/2013 | Mashevsky et al. | |
| 8,578,481 B2 | 11/2013 | Rowley | |
| 8,584,239 B2 | 11/2013 | Aziz et al. | |
| 8,646,088 B2 | 2/2014 | Pistoia et al. | |
| 8,656,491 B1 | 2/2014 | Daswani et al. | |
| 8,677,487 B2 | 3/2014 | Balupari et al. | |
| 8,683,584 B1 | 3/2014 | Daswani et al. | |
| 8,707,441 B1 | 4/2014 | Cidambi et al. | |
| 8,756,691 B2 | 6/2014 | Nachenberg | |
| 8,838,570 B1 | 9/2014 | English | |
| 9,003,526 B2 | 4/2015 | El-Moussa | |
| 2004/0030913 A1* | 2/2004 | Liang et al. | 713/200 |
| 2004/0107416 A1* | 6/2004 | Buban et al. | 717/170 |
| 2005/0177602 A1 | 8/2005 | Kaler et al. | |
| 2006/0168024 A1 | 7/2006 | Mehr et al. | |
| 2007/0050850 A1* | 3/2007 | Katoh et al. | 726/27 |
| 2007/0192857 A1* | 8/2007 | Ben-Itzhak | 726/22 |
| 2007/0261112 A1 | 11/2007 | Todd et al. | |
| 2008/0016552 A1 | 1/2008 | Hart | |
| 2008/0177755 A1* | 7/2008 | Stern et al. | 707/100 |
| 2008/0177994 A1 | 7/2008 | Mayer | |
| 2008/0209562 A1* | 8/2008 | Szor | 726/24 |
| 2008/0229393 A1* | 9/2008 | Congdon | 726/4 |
| 2008/0256633 A1* | 10/2008 | Arnold et al. | 726/22 |
| 2008/0263658 A1* | 10/2008 | Michael et al. | 726/22 |
| 2008/0263659 A1* | 10/2008 | Alme | 726/22 |
| 2008/0320594 A1* | 12/2008 | Jiang | 726/24 |
| 2009/0019547 A1* | 1/2009 | Palliyil et al. | 726/25 |
| 2009/0055928 A1 | 2/2009 | Kang et al. | |
| 2009/0144826 A2 | 6/2009 | Piccard | |
| 2009/0150419 A1* | 6/2009 | Kim et al. | 707/101 |
| 2009/0241190 A1* | 9/2009 | Todd et al. | 726/23 |
| 2009/0282485 A1* | 11/2009 | Bennett | 726/24 |
| 2009/0288167 A1* | 11/2009 | Freericks et al. | 726/23 |
| 2010/0043072 A1 | 2/2010 | Rothwell | |
| 2010/0077481 A1 | 3/2010 | Polyakov et al. | |
| 2010/0107252 A1 | 4/2010 | Mertoguno | |
| 2010/0115586 A1 | 5/2010 | Raghavan et al. | |
| 2010/0154059 A1* | 6/2010 | McNamee et al. | 726/23 |
| 2010/0162350 A1 | 6/2010 | Jeong et al. | |
| 2010/0175132 A1* | 7/2010 | Zawadowskiy et al. | 726/23 |
| 2011/0041179 A1 | 2/2011 | St. Hlberg | |
| 2011/0055923 A1 | 3/2011 | Thomas | |
| 2011/0090911 A1* | 4/2011 | Hao et al. | 370/395.53 |
| 2011/0099620 A1 | 4/2011 | Stavrou et al. | |
| 2011/0167495 A1 | 7/2011 | Antonakakis et al. | |
| 2011/0173698 A1* | 7/2011 | Polyakov et al. | 726/23 |
| 2011/0185425 A1 | 7/2011 | Lee et al. | |
| 2011/0252474 A1 | 10/2011 | Ward et al. | |
| 2011/0271342 A1* | 11/2011 | Chung et al. | 726/23 |
| 2011/0296412 A1 | 12/2011 | Banga et al. | |
| 2011/0296486 A1 | 12/2011 | Burch et al. | |
| 2012/0084860 A1 | 4/2012 | Cao et al. | |
| 2012/0089700 A1 | 4/2012 | Safruti et al. | |
| 2012/0096549 A1 | 4/2012 | Amini et al. | |
| 2012/0117650 A1 | 5/2012 | Nachenberg | |
| 2012/0117652 A1* | 5/2012 | Manni et al. | 726/24 |
| 2012/0192274 A1* | 7/2012 | Odom et al. | 726/23 |
| 2012/0233691 A1 | 9/2012 | Jiang | |
| 2012/0240224 A1 | 9/2012 | Payne et al. | |
| 2012/0255018 A1* | 10/2012 | Sallam | 726/24 |
| 2012/0255019 A1* | 10/2012 | McNamee et al. | 726/24 |
| 2012/0255021 A1* | 10/2012 | Sallam | 726/25 |
| 2012/0255031 A1* | 10/2012 | Sallam | 726/27 |
| 2012/0278889 A1 | 11/2012 | El-Moussa | |
| 2012/0291131 A1* | 11/2012 | Turkulainen et al. | 726/24 |
| 2013/0014259 A1* | 1/2013 | Gribble et al. | 726/24 |
| 2013/0047147 A1* | 2/2013 | McNeill | 717/173 |
| 2013/0055394 A1* | 2/2013 | Beresnevichiene et al. | 726/24 |
| 2013/0091350 A1* | 4/2013 | Gluck | 713/153 |
| 2013/0091570 A1* | 4/2013 | McCorkendale et al. | 726/23 |
| 2013/0104230 A1 | 4/2013 | Tang et al. | |
| 2013/0145002 A1* | 6/2013 | Kannan et al. | 709/223 |
| 2013/0145008 A1* | 6/2013 | Kannan et al. | 709/223 |
| 2013/0152200 A1* | 6/2013 | Alme et al. | 726/24 |
| 2013/0227165 A1 | 8/2013 | Liu | |
| 2013/0246685 A1* | 9/2013 | Bhargava et al. | 711/6 |
| 2013/0298184 A1 | 11/2013 | Ermagan et al. | |
| 2013/0298192 A1 | 11/2013 | Kumar et al. | |
| 2013/0298230 A1 | 11/2013 | Kumar et al. | |
| 2013/0298242 A1 | 11/2013 | Kumar et al. | |
| 2013/0298243 A1 | 11/2013 | Kumar et al. | |
| 2013/0298244 A1 | 11/2013 | Kumar et al. | |
| 2013/0326625 A1 | 12/2013 | Anderson et al. | |
| 2014/0059641 A1 | 2/2014 | Chapman et al. | |
| 2014/0096131 A1* | 4/2014 | Sonnek et al. | 718/1 |
| 2014/0283037 A1* | 9/2014 | Sikorski et al. | 726/22 |
| 2014/0380474 A1* | 12/2014 | Paithane et al. | 726/23 |
| 2015/0058984 A1* | 2/2015 | Shen et al. | 726/23 |

FOREIGN PATENT DOCUMENTS

| | | |
|---|---|---|
| WO | 2013067508 | 5/2013 |
| WO | 2013134206 | 9/2013 |

OTHER PUBLICATIONS

Wagener et al., "An Instrumented Analysis of Unknown Software and Malware Driven by Free Libre Open Source Software", Signal Image Technology and Internet Based Systems, 2008. SITIS'08. IEEE International Conference on. IEEE, 2008.
Davidoff et al., "Chapter 12: Malware Forensics", Network Forensics: Tracking Hackers Through Cyberspace, Pearson Education Inc., Jun. 2012, 60 pages.
van der Heide et al., "DNS Anomaly Detection," System and Network Engineering Research Group, University of Amsterdam, Feb. 6, 2011, 20 pages.
Sikorski et al., "Chapter 14: Malware-Focused Network Signatures," Practical Malware Anlaysis, No Starch Press, Feb. 2012, 13 pages.
Zang et al., "Botnet Detection Through Fine Flow Classifcation", CSE Dept. Technical Report No. CSE11-001, p. 1-17, Jan. 31, 2011.
Landecki, Grzegorz, Detecting Botnets, Linux Journal, Jan. 1, 2009.
Karasaridis, Anestis et al., Wide-scale Botnet Detection and Characterization, Dec. 14, 2010.
Author Unknown, Advanced Persistent Threats (APT), What's an APT? A Brief Definition, Damballa, Dec. 14, 2010.
Author Unknown, Executive Overview, The Command Structure of the Aurora Botnet, Damballa, Mar. 2010.
Strayer, W. Timothy et al. Detecting Botnets with Tight Command and Control, BBN Technologies, Nov. 2006.
Ramachandran, Anirudh et al., Revealing Botnet Membership Using DNSBL Counter-Intelligence, Jul. 7, 2006.
Goebel, Jan et al., Rishi: Identify Bot Contaminated Hosts by IRC Nickname Evaluation, Apr. 2007.
Gu, Guofei et al., BotSniffer: Detecting Botnet Command and Control Channels in Network Traffic, Feb. 2008.
Gu, Guofei et al., BotHunter: Detecting Malware Infection Through IDS-Driven Dialog Correlation, Aug. 2007.
Gu, Guofei et al., BotMiner: Clustering Analysis of Network Traffic for Protocol- and Structure-Independent Botnet Detection, Jul. 2008.
Royal, Paul, Analysis of the Kraken Botnet, Damballa, Apr. 9, 2008.
Livadas, Carl et al., Using Machine Learning Techniques to Identify Botnet Traffic, BBN Technologies, Nov. 2006.
Binkley, James R. et al., An Algorithm for Anomaly-based Botnet Detection, Jul. 2006.
Yen, Ting-Fang et al., Traffic Aggregation for Malware Detection, Jul. 2008.
Author Unknown, Anatomy of a Targeted Attack, Damballa, Dec. 3, 2008.

(56) References Cited

OTHER PUBLICATIONS

Author Unknown, Layer 8, How and Why Targeted Attacks Exploit Your Users, Damballa, Nov. 2011.
Author Unknown, Targeted Attacks for Fun and Profit, An Executed Guide to a New and Growing Enterprise Threat, Damballa, Oct. 13, 2008.
Author Unknown, AV, IDS/IPS and Damballa's Response to Targeted Attacks, A Technology Comparison, Damballa, Nov. 2008.
Author Unknown, Updated on the Enemy, A Deconstruction of Who Profits From Botnets, Damballa, May 13, 2009.
Author Unknown, A Day in the Life of a BotArmy, Damballa, Month Unknown, 2008 (2008 is prior to the year 2012).
Ollmann, Gunter, Botnet Communication Topologies, Understanding the Intricacies of Bonet Command and Control, Damballa, Jun. 2009.
Ollmann, Gunter, The Botnet vs. Malware Relationship, The One to one Botnet Myth, Damballa, Jun. 2009.
Author Unknown, Closed Window, How Failsafe Enhancements Dramatically Limit Opportunities for Malware Armies and other Targeted Attacks, Damballa, Sep. 23, 2009.
Author Unknown, Damballa's In-The-Cloud Security Model, Enterprise Protection Moves Beyond the Network Perimeter, Damballa, Aug. 24, 2008.
Ollmann, Gunter, Extracting CnC from Malware, The Role of malware Sample Analysis in Botnet Detection, Damballa, Dec. 8, 2009.
Ollmann, Gunter, The Opt-IN Botnet Generation, Hacktivism and Centrally Controlled Protesting, Social Networks, Damballa, Apr. 26, 2010.
Ollmann, Gunter, Serial Variant Evasion Tactics, Techniques Used to Automatically Bypass Antivirus Technologies, Damballa, Oct. 7, 2009.
Author Unknown, Damballa: A Different Approach, Targeted Attacks Requires a New Solution, Damballa, Sep. 23, 2008.
Author Unknown, Trust Betrayed, What to Do When a Targeted Attack Turns Your Networks Against You, Damballa, Feb. 22, 2008.
Author Unknown, How to Be a Hero in the War Against BotArmies, Damballa, Month Unknown, 2008 (2008 is prior to 2012).
Giroire, Frederic et al., Exploiting Temporal Persistence to Detect Convert Botnet Channels, Sep. 2009.
Russ White, "High Availability in Routing", Mar. 2004, Cisco Systems, vol. 7, Issue 1, pp. 2-14.
Yadav et al., "Detecting Algorithmically Generated Malicious Domain Names", Nov. 2010.
Abu Rajab et al., "A Multifaceted Approach to Understanding the Botnet Phenonmenon," Proceedings of the 6th ACM SIGCOMM conference on Internet measurement, Oct. 2006, 12 pages.
Author Unknown, "FireEye Malware Analysis", FireEye.com, FireEye, Inc., Month Unknown, 2010 (2010 is prior to 2012).
Author Unknown, "Hybrid Sandboxing for Detecting and Analyzing Advanced and Unknown Malware", Blue Coat Systems, Inc., Nov. 2013.
Author Unknown, "Multi-Vector Virtual Execution (MVX) Engine", FireEye, Inc., http://www.fireeye.com/products-and-solutions/virtual-execution-engine.html, Jun. 2014.
Chen et al., "Chapter 4: Guarding Against Network Intrusions," Network and System Security, Elsevier Inc., Feb. 2009, 5 pages.
Lau et al., "Measuring Virtual Machine Detection in Malware using DSD Tracer", Sophoslabs, Journal in Computer Virology, Aug. 2008.
Ligh et al., "Chapter 5: Researching Domains and IP Addresses," Malware Analyst's Cookbook, John Wiley & Sons, Nov. 2010, 38 pages.
Lindorfer et al., "Detecting Enviroment-Sensitive Malware", Recent Advances in Intrusion Detection. Springer Berlin Heidelberg, Jan. 2011.
Schechter et al., "Fast Detection of Scanning Worm Infections," Recent Advances in Intrusion Detection: 7th International Symposium RAID 2004 Proceedings, Jan. 2004, 24 pages.
Singh et al., "Hot Knives Through Butter: Evading File-based Sandboxes", FireEye, Inc., Feb. 2014.
Dittrich et al., P2P as Botnet Command and Control; A Deeper Insight, 2008 3rd International Conference on Malicious and Unwanted Software (Malware), Oct. 2008, IEEE, vol. 10, pp. 41-48.

\* cited by examiner

```
#define VMWARE_HYPERVISOR_MAGIC 0x564D5868
define VMWARE_HYPERVISOR_PORT  0x5658 define VMWARE_PORT_CMD_GETVERSION    10 define VMWARE_PORT(cmd, eax, ebx, ecx, edx)                \
    __asm__("inl (%%dx)" :                                  \
        "=a"(eax), "=c"(ecx), "=d"(edx), "=b"(ebx) :        \
        "0"(VMWARE_HYPERVISOR_MAGIC),                       \
        "1"(VMWARE_PORT_CMD_##cmd),                         \
        "2"(VMWARE_HYPERVISOR_PORT), "3"(UINT_MAX) :        \
        "memory");

int hypervisor_port_check(void)
{
    uint32_t eax, ebx, ecx, edx;
    VMWARE_PORT(GETVERSION, eax, ebx, ecx, edx);
    if (ebx == VMWARE_HYPERVISOR_MAGIC)
        return 1;         // Success - running under VMware
    else
        return 0;
}
```

FIG. 4

DETECTING MALWARE

BACKGROUND OF THE INVENTION

Nefarious individuals attempt to compromise computer systems in a variety of ways. As an example, such individuals may embed or otherwise include malicious software ("malware") in email attachments and transmit or cause them to be transmitted to unsuspecting users. An administrator of the recipient computer system can attempt to prevent compromise by blocking all downloads of all attachments by the computer system. However, such a policy will also prevent legitimate attachments from being available to the user. As an alternate approach, the administrator can require that a security scan be performed prior to the download of an attachment. Unfortunately, malware authors are crafting increasingly sophisticated malware that is increasingly able to evade detection. Accordingly, there exists an ongoing need for improved techniques to detect malware and prevent its harm.

BRIEF SUMMARY OF THE INVENTION

Candidate malware potentially includes one or more malicious elements. The candidate malware is analyzed using a virtual machine. If the candidate malware attempts to perform an anti-virtual machine action during analysis, a conclusion is made that the candidate malware is malicious.

BRIEF DESCRIPTION OF THE DRAWINGS

Various embodiments of the invention are disclosed in the following detailed description and the accompanying drawings.

FIG. 4 illustrates an example of code which can be used to determine whether a process is executing in a virtual environment.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
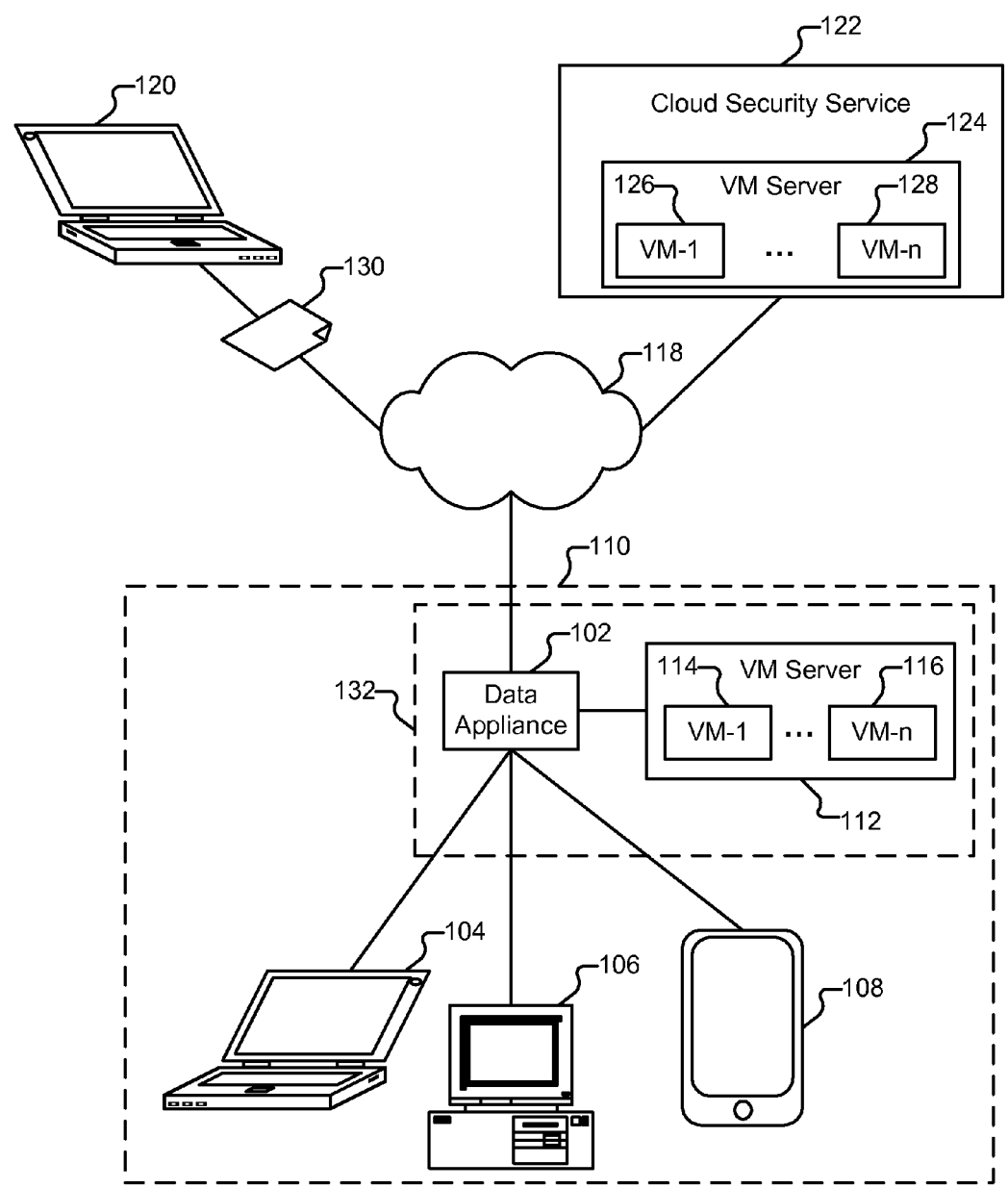
FIG. 1 illustrates an example of an environment in which malware is detected and prevented from causing harm.

FIG. 1 illustrates an example of an environment in which malware is detected and prevented from causing harm. In particular, a variety of attempts by a malicious individual to propagate malware (such as malware 130) via system 120 are described, as are techniques for thwarting that propagation.

In the example shown in FIG. 1, client devices 104-108 are a laptop computer, a desktop computer, and a tablet (respectively) present in an enterprise network 110. Data appliance 102 is configured to enforce policies regarding communications between clients, such as clients 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110.

Appliance 102 can take a variety of forms. For example, appliance 102 can be a dedicated device or set of devices. The functionality provided by appliance 102 can also be integrated into or executed as software on a general purpose computer, a computer server, a gateway, and/or a network/routing device. For example, in some embodiments services provided by data appliance 102 are instead (or in addition) provided to client 104 by software executing on client 104.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable.

As will be described in more detail below, appliance 102 can be configured to work in cooperation with one or more virtual machine servers (112, 124) to perform malware analysis/prevention. As one example, data appliance 102 can be configured to provide a copy of malware 130 to one or more of the virtual machine servers for real-time analysis. As another example, service 122 can provide a list of signatures of known-malicious documents to appliance 102 as part of a subscription. Those signatures can be generated by service 122 in conjunction with the techniques described herein.

An example of a virtual machine server is a physical machine comprising commercially available server-class hardware (e.g., a multi-core processor, 4+ Gigabytes of RAM, and one or more Gigabit network interface adapters)

that runs commercially available virtualization software, such as VMware ESXi, Citrix XenServer, or Microsoft Hyper-V. The virtual machine servers may be separate from, but in communication with, data appliance 102, as shown in FIG. 1. A virtual machine server may also perform some or all of the functions of data appliance 102, and a separate data appliance 102 is omitted as applicable. Further, a virtual machine server may be under the control of the same entity that administers data appliance 102 (e.g., virtual machine server 112); the virtual machine server may also be provided by a third party (e.g., virtual machine server 124, which can be configured to provide services to appliance 102 via third party service 122). In some embodiments, data appliance 102 is configured to use one or the other of virtual machine servers 112 and 124 for malware analysis. In other embodiments, data appliance 102 is configured to use the services of both servers (and/or additional servers not pictured).

Figure 2:
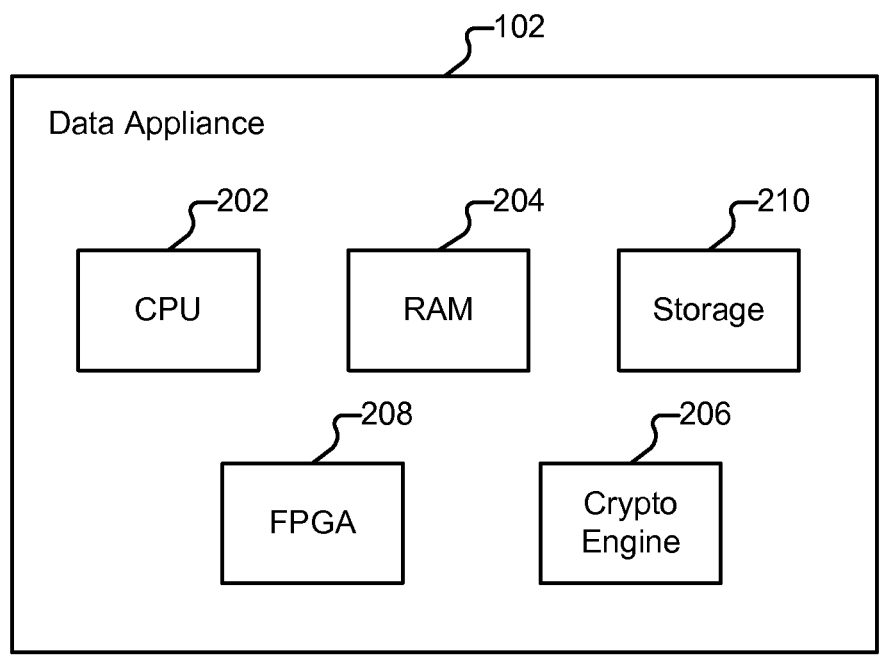
FIG. 2 illustrates an embodiment of a data appliance.

FIG. 2 illustrates an embodiment of a data appliance. The example shown is a representation of physical components that are included in appliance 102, in some embodiments. Specifically, appliance 102 includes a high performance multi-core CPU 202 and RAM 204. Appliance 102 also includes a storage 210 (such as one or more hard disks), which is used to store policy and other configuration information, as well as URL information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Using Virtual Machines to Analyze Attachments

A virtual machine (VM) can be used to perform behavior profiling (e.g., in a VM sandbox environment) using various heuristic-based analysis techniques that can be performed in real-time during a file transfer (e.g., during a file/attachment download). As one example, suppose a malicious user of system 120 sends an email message to a user of client 104 that includes a malicious attachment. The attachment may be an executable (e.g., having a .exe extension) and may also be a document (e.g., a .doc or .pdf file). The message is received by data appliance 102, which determines whether a signature for the attachment is present on data appliance 102. A signature, if present, can indicate that the attachment is known to be safe, and can also indicate that the attachment is known to be malicious. If no signature for the attachment is found, data appliance 102 is configured to provide the attachment to a virtual machine server, such as virtual machine server 112, for analysis.

Virtual machine server 112 is configured to execute (or open, as applicable) the attachment in one or more virtual machines 114-116. The virtual machines may all execute the same operating system (e.g., Microsoft Windows) or may execute different operating systems or versions thereof (e.g., with VM 116 emulating an Android operating system). In some embodiments, the VM(s) chosen to analyze the attachment are selected to match the operating system of the intended recipient of the attachment being analyzed (e.g., the operating system of client 104). Observed behaviors resulting from executing/opening the attachment (such as changes to certain platform, software, or registry settings) are logged and analyzed for indications that the attachment is malicious. In some embodiments the log analysis is performed by the VM server (e.g., VM server 112). In other embodiments, the analysis is performed at least in part by appliance 102. The malware analysis and enforcement functionality illustrated in FIG. 1 as being provided by data appliance 102 and VM server 112 is also referred to herein as being provided by malware analysis system 132. As explained above, portions of malware analysis system 132 may be provided by multiple distinct devices, but may also be provided on a single platform, as applicable.

If the attachment is determined to be malicious, appliance 102 can automatically block the file download based on the analysis result. Further, a signature can be generated and distributed (e.g., to other data appliances) to automatically block future file transfer requests to download the file determined to be malicious.

Detecting Anti-Virtual Machine Actions

Malware authors use increasingly sophisticated techniques when crafting their malware so that it avoids detection by security systems. One such technique is to have the malware attempt to determine whether it is executing in a virtual machine environment, and if so, to stop executing or otherwise not engage in malicious activities.

In various embodiments, malware analysis system 132 is configured to detect attempts (e.g., by an attachment executing in a virtual machine) to detect that it is executing within a virtual machine environment. Any such attempts (also referred to herein as "anti-virtual machine actions") are treated as malicious actions and will result in the attachment being classified as malicious. A variety of techniques for detecting anti-virtual machine actions will be described in conjunction with FIG. 3.

Figure 3:
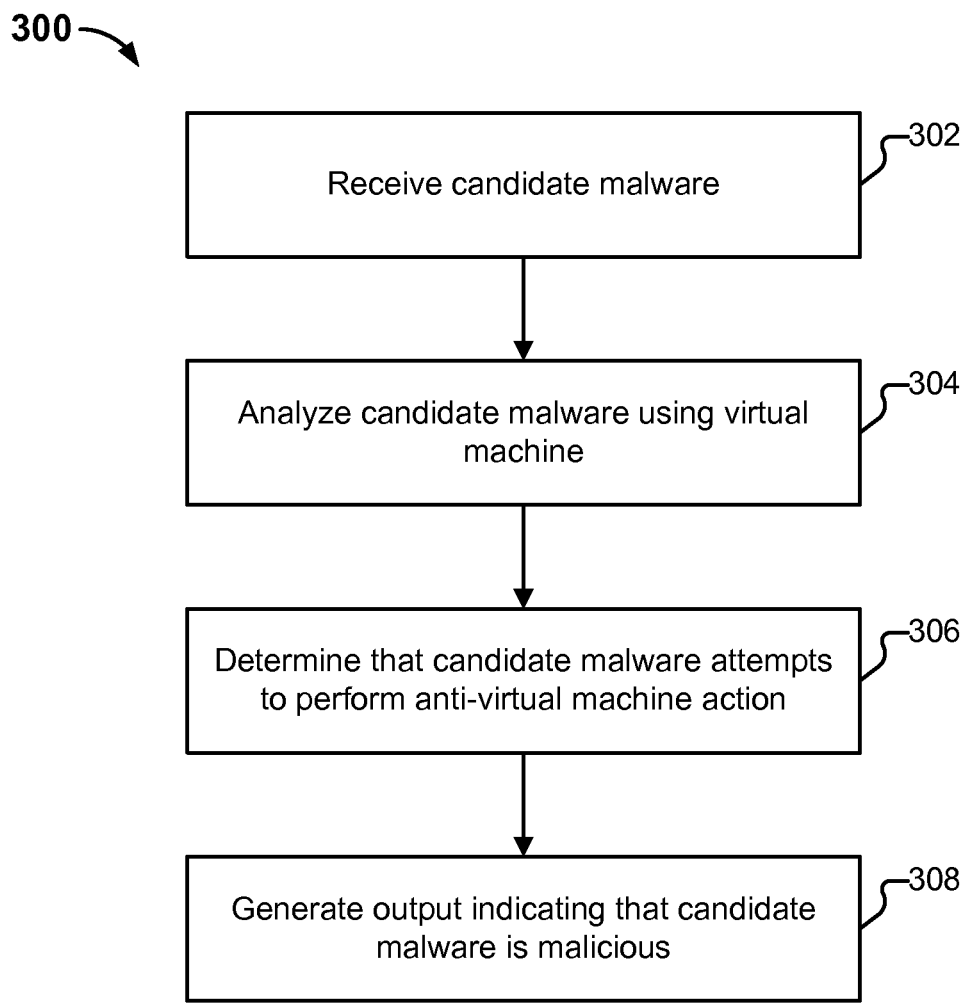
FIG. 3 illustrates an embodiment of a process for detecting an anti-virtual machine action.

FIG. 3 illustrates an embodiment of a process for detecting an anti-virtual machine action. In various embodiments, process 300 is performed by malware analysis system 132. The process begins at 302 when candidate malware is received. As one example, candidate malware is received at 302 when an email (including an attachment) is received by data appliance 102 from system 120. As another example, data appliance 102 can be configured to transmit the attachment to service 122 for analysis. In that scenario, the candidate is received by service 122 at 302.

At 304, the candidate malware is analyzed using one or more virtual machines. For example, the candidate malware can be executed in virtual machine 114 and any behaviors logged for analysis by system 132. As another example, the candidate malware can be executed in virtual machines 126-128 and analyzed by service 122.

The following are examples of anti-virtual machine actions:

The candidate malware attempts to check the product ID of a Microsoft Windows install.

The candidate malware attempts to check the computer name.

The candidate malware attempts to check the name of hardware, such as the name of a harddrive (e.g., because a virtual machine will by default have a harddrive name indicative of the fact that it is a virtual machine).

The candidate malware attempts to check a MAC address (e.g., because a virtual machine will by default have a MAC that conforms to a specific pattern).

Additional anti-virtual machine actions are discussed below.

At 306, a determination is made as to whether anti-virtual machine actions (such as, but not limited to those described herein) have taken place. And, if so, at 308, output is generated that indicates that the candidate malware is malicious. As one example, at 308 a signature for the attachment is generated (e.g., as an MD5 hash-based signature). As another example, instead of or in addition to generating a signature, an alert is generated that instructs data appliance 102 not to provide the attachment to client 104.

In various embodiments, system 132 is configured to thwart anti-virtual machine actions. For example, virtual machine server 112 can be configured to provide virtual machines such as virtual machine 114 with randomized product IDs. As another example, the computer name associated with virtual machine 114 can be randomized. As yet another example, the computer name associated with virtual machine 114 can be set to a very common name, such as "HOME" or "WORKGROUP." As yet another example, the harddrive name can be randomized or set to a very common name. As yet another example, the MAC address can be randomized.

VM-Specific Opcodes

An additional way that malware can attempt to ascertain whether it is being run in a virtual machine is by attempting to use a specific sequence of opcodes that are only supported in given virtualized environments. Illustrated in FIG. 4 is an example of code, which if included in malware, could be used by the malware to detect whether or not the malware is being executed in a VMware environment.

In some embodiments, system 132 is configured to perform static analysis of candidate malware. In particular, it is configured to look for the presence in the candidate malware of functions/methods/opcodes that are only supported in virtualized environments.

In addition to or instead of performing such static analysis, system 132 can also be configured to apply one or more hotpatches to a virtual machine such as virtual machine 114. As one example, a hotpatch can be used to hook the hypervisor layer to return a FAIL (or a random string) instead of revealing to the malware that it is executing in a virtualized environment (e.g., because a string containing "vmware" would otherwise be returned). As another example, the hotpatch can be used to implement detailed logging (e.g., to obtain a detailed call graph).

Sophisticated malware might attempt to detect whether hotpatches have been applied (i.e., the running environment has been hooked). As an example, suppose the malware calls "LoadLibraryA" and "GetProcAddress" to get the original binary code from system files, and compares it with the version that is in memory (e.g., using memcmp). In some embodiments, system 132 is configured to monitor for such function calls. For example, which API calls are being made can be logged and analyzed. If calls indicative of attempts to detect API hooking are observed, the candidate malware is deemed to be taking anti-virtual machine actions and is flagged as malicious accordingly. Further, system 132 can be configured to thwart hotpatch detection by allowing a portion of memory to be writable and executable, but not readable.

In the event that malware determines it is operating in a hooked environment, it might simply cease executing. It may also attempt to restore the hooked portion back to its original state. Any such restore attempts can be monitored for by system 132 and, if observed, treated as anti-virtual machine actions. In some embodiments, system 132 is configured to take steps to counteract any efforts by malware to revert hooked portions. As one example, a standalone thread can be used to periodically check that hotpatches that ought to have been applied are still present. A second approach is to perform on-demand checking. For example, whenever the function "WriteFile" is called, system 132 can perform a check that "CreateFileA"/"CreateFileW" is restored.

Sleep

One additional approach that malware might use to attempt to evade detection while executing in a virtualized environment is the use of a sleep function. Specifically, the malware may attempt to sleep for an extended period of time—either through repeated sleep calls or through a single, lengthy sleep. In some embodiments, system 132 is configured to modify the behavior of the sleep function through API-hooking. For example, a maximum sleep duration can be specified. As another example, repeated calls to sleep can be marked as suspicious and/or subsequent sleeps can be ignored.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
  receive a candidate malware potentially including one or more malicious elements;
  analyze the candidate malware using a virtual machine, including by:
    evaluating one or more actions taken by the candidate malware, when executing in the virtual machine, to determine whether the candidate malware is attempting to take an anti-virtual machine action;
  determine that at least one action taken by the candidate malware when executing in the virtual machine is an anti-virtual machine action, comprising an attempt to check that the candidate malware is running in a virtualized environment; and
  in response to the determination, generate as output an alert that the candidate malware is malicious; and
a memory coupled to the processor and configured to provide the processor with instructions.

2. The system of claim 1 wherein generating the alert includes generating a signature associated with the candidate malware that indicates that the candidate malware is malicious.

3. The system of claim 1 wherein the anti-virtual machine action comprises an attempt by the candidate malware to ascertain a product identifier of an operating system.

4. The system of claim 1 wherein the processor is further configured to generate a random product identifier for use by the virtual machine.

5. The system of claim 1 wherein the anti-virtual machine action comprises an attempt by the candidate malware to ascertain a computer name.

6. The system of claim 1 wherein the processor is further configured to generate a random computer name for use by the virtual machine.

7. The system of claim 1 wherein the anti-virtual machine action comprises an attempt by the candidate malware to ascertain an identifier of a hard drive.

8. The system of claim 1 wherein the processor is further configured to generate a random hard drive identifier for use by the virtual machine.

9. The system of claim 1 wherein the anti-virtual machine action comprises an attempt by the candidate malware to ascertain a MAC address.

10. The system of claim 1 wherein the processor is further configured to generate a random MAC address for use by the virtual machine.

11. The system of claim 1 wherein the processor is further configured to determine whether the candidate malware includes at least one virtualized environment-specific opcode.

12. The system of claim 1 wherein the processor is further configured to apply one or more hotpatches.

13. The system of claim 1 wherein the anti-virtual machine action comprises an attempt to detect hotpatching.

14. The system of claim 1 wherein the anti-virtual machine action comprises an attempt to revert a hotpatch.

15. The system of claim 1 wherein the processor is further configured to confirm that a previously applied hotpatch is still in effect.

16. The system of claim 1 wherein the anti-virtual machine action comprises one or more sleep actions.

17. A method, comprising:
- receiving a candidate malware potentially including one or more malicious elements;
- analyzing the candidate malware using a virtual machine, including by:
  - evaluating one or more actions taken by the candidate malware, when executing in the virtual machine, to determine whether the candidate malware is attempting to take an anti-virtual machine action;
- determining, that at least one action taken by the candidate malware when executing in the virtual machine is an anti-virtual machine action, comprising an attempt to check that the candidate malware is running in a virtualized environment; and
- in response to the determination, generating as output an alert that the candidate malware is malicious.

18. A computer program product embodied in a non-transitory computer readable medium and comprising computer instructions for:
- receiving a candidate malware potentially including one or more malicious elements;
- analyzing the candidate malware using a virtual machine, including by:
  - evaluating one or more actions taken by the candidate malware, when executing in the virtual machine, to determine whether the candidate malware is attempting to take an anti-virtual machine action;
- determining, that at least one action taken by the candidate malware when executing in the virtual machine is an anti-virtual machine action, comprising an attempt to check that the candidate malware is running in a virtualized environment; and
- in response to the determination, generating as output an alert that the candidate malware is malicious.

19. The method of claim 17 wherein the anti-virtual machine action comprises an attempt by the candidate malware to ascertain a product identifier of an operating system.

20. The method of claim 17 wherein the anti-virtual machine action comprises an attempt by the candidate malware to ascertain a computer name.

\* \* \* \* \*